(12) United States Patent
Vare et al.

(10) Patent No.: US 7,702,337 B2
(45) Date of Patent: Apr. 20, 2010

(54) METHOD AND SYSTEM FOR PROVIDING QUICK SERVICE ACCESS

(75) Inventors: Jani Vare, Kaarina (FI); Kari S. Virtanen, Merimasku (FI)

(73) Assignee: Nokia Corporation, Espoo (FI)

( * ) Notice: Subject to any disclaimer, the term of this patent is extended or adjusted under 35 U.S.C. 154(b) by 992 days.

(21) Appl. No.: 11/434,150

(22) Filed: May 16, 2006

(65) Prior Publication Data
US 2007/0268874 A1 Nov. 22, 2007

(51) Int. Cl.
*H04L 12/28* (2006.01)
(52) U.S. Cl. .................... 455/452.1; 370/338
(58) Field of Classification Search .......... None
See application file for complete search history.

(56) References Cited

U.S. PATENT DOCUMENTS

| | | | |
|---|---|---|---|
| 2002/0010918 A1 | 1/2002 | Mankovitz et al. | |
| 2004/0120285 A1 | 6/2004 | Paila et al. | |
| 2007/0280257 A1* | 12/2007 | Vare et al. | 370/395.3 |
| 2007/0287451 A1* | 12/2007 | Seo et al. | 455/434 |

FOREIGN PATENT DOCUMENTS

| EP | 0822716 | 2/1998 |
|---|---|---|
| EP | 1049336 | 11/2000 |
| WO | 2005083918 | 9/2005 |

OTHER PUBLICATIONS

International Search Report and Written Opinion for International Application No. PCT/IB2007/001190, mailed Mar. 18, 2008, 10 pages.
Open Mobile Alliance Ltd, "Service Guide for Mobile Broadcast Services", Draft Version 1.0, Aug. 18, 2005, 53 pages.
International Preliminary Report on Patentability for International Application No. PCT/IB2007/001190, mailed Nov. 27, 2008, 8 pages.
International Search Report for application No. PCT/IB2007/001190, mailed Nov. 27, 2007, 5 pages.

* cited by examiner

*Primary Examiner*—Thanh C Le
(74) *Attorney, Agent, or Firm*—Banner & Witcoff, Ltd.

(57) ABSTRACT

Provided are apparatuses and methods for transmitting and receiving quick access services. For example, a mobile terminal may receive a data stream containing a quick access service of a particular type. The quick access service may have a fixed Packet Identification (PID) and/or fixed IP address. The fixed PID and/or fixed IP addressed may be associated with a quick access service based on the particular type of the quick access service. In another example, a mobile terminal and a user interface on a mobile terminal may provide a menu for selection of an access mode for accessing the quick access service. Also, a quick access service may be selected based on the type of the quick access service.

18 Claims, 13 Drawing Sheets

| Channel / service type | PID | IP addresses |
|---|---|---|
| News | 0x4b0 | Range A |
| Sports | 0x4b1 | Range B |
| Music | 0x4b2 | Range C |
| Kids | 0x4b3 | Range D |
| Chat | 0x4b4 | Range E |
| Soap | 0x4b5 | Range F |

FIG. 5

| Syntax | No. of bits | Identifier |
|---|---|---|
| quick_access_indicator_descriptor(){ | | |
|   descriptor_tag | 8 | uimsbf |
|   descritor_length | 8 | uimsbf |
| } | | |

FIG. 9

METHOD AND SYSTEM FOR PROVIDING QUICK SERVICE ACCESS

TECHNICAL FIELD

Aspects of the invention relate generally to communications networks. More specifically, aspects of the invention relate to providing quick access to services in a communication network.

BACKGROUND OF THE INVENTION

Digital broadband broadcast networks enable end users to receive digital content including video, audio, data, and so forth. End users may receive program or service information such as a broadcast program in a data stream via an IP Datacast (IPDC) over a broadcast network, for example. In addition, data may be transmitted in an Electronic Service Guide (ESG) to an end user.

Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting. The ESG data may be transmitted using different types of wireless digital networks including digital broadband broadcast and/or multicast networks.

Access of program or service information over a broadcast network may require long access times. The access times necessary to obtain programs or services may be further extended when an end user moves from one location to another. For example, an end user may move from a first location to a second location and attempt to receive programs or services at the second location. The end user in this case may need to initialize the mobile terminal prior to receiving any program or service. This may entail scanning for a signal until a frequency is found or updating an ESG for the mobile terminal. These activities may be time consuming and while the mobile terminal is initializing, the user is unable to receive any programs or services. This is frustrating for the user.

Hence, there is a need for efficient and effective methods and systems for delivery of program or service information to a mobile device such as a mobile TV device. There is also a need for a method or system in which an end user may quickly and efficiently access a program or service via a mobile terminal in a communication network.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example, a method is provided for receiving quick access services at a mobile terminal, wherein data of the quick access service received at the mobile terminal includes data packets with corresponding fixed packet identifiers (PID). The PIDs may be fixed based on the type of the quick access service received.

In another example, a mobile terminal is provided for receiving quick access services. The mobile terminal may include an input for receiving data packets of the quick access service. The data packets of a particular type of quick access service may have a fixed PID and/or IP address.

In another example, a transmitter is provided for providing quick access service to a mobile terminal. For example, the transmitter may assemble data packets corresponding to a service wherein each data packet of a particular type of quick access service contains a fixed PID. In another example, the transmitter may contain a mapping module for assigning fixed PID addresses or fixed IP addresses to a data stream for transmitting the quick access service.

In another example, a computer-readable medium is provided having a data structure stored thereon for providing menus for selecting a quick access service type and/or an access mode for receiving the quick access service. In one example, the quick access service has a fixed PID and/or fixed IP addressed based on the type of the quick access service.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 illustrates an example of a mapping table for mapping service channels with corresponding PID values and IP addresses in accordance with at least one aspect of the present invention.

FIG. 9 illustrates an example of an indicator or descriptor for identifying quick access services in accordance with at least one aspect of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

It is noted that various connections are set forth between elements in the following description. It is noted that these connections in general and, unless specified otherwise, may be direct or indirect and that this specification is not intended to be limiting in this respect.

Figure 1:
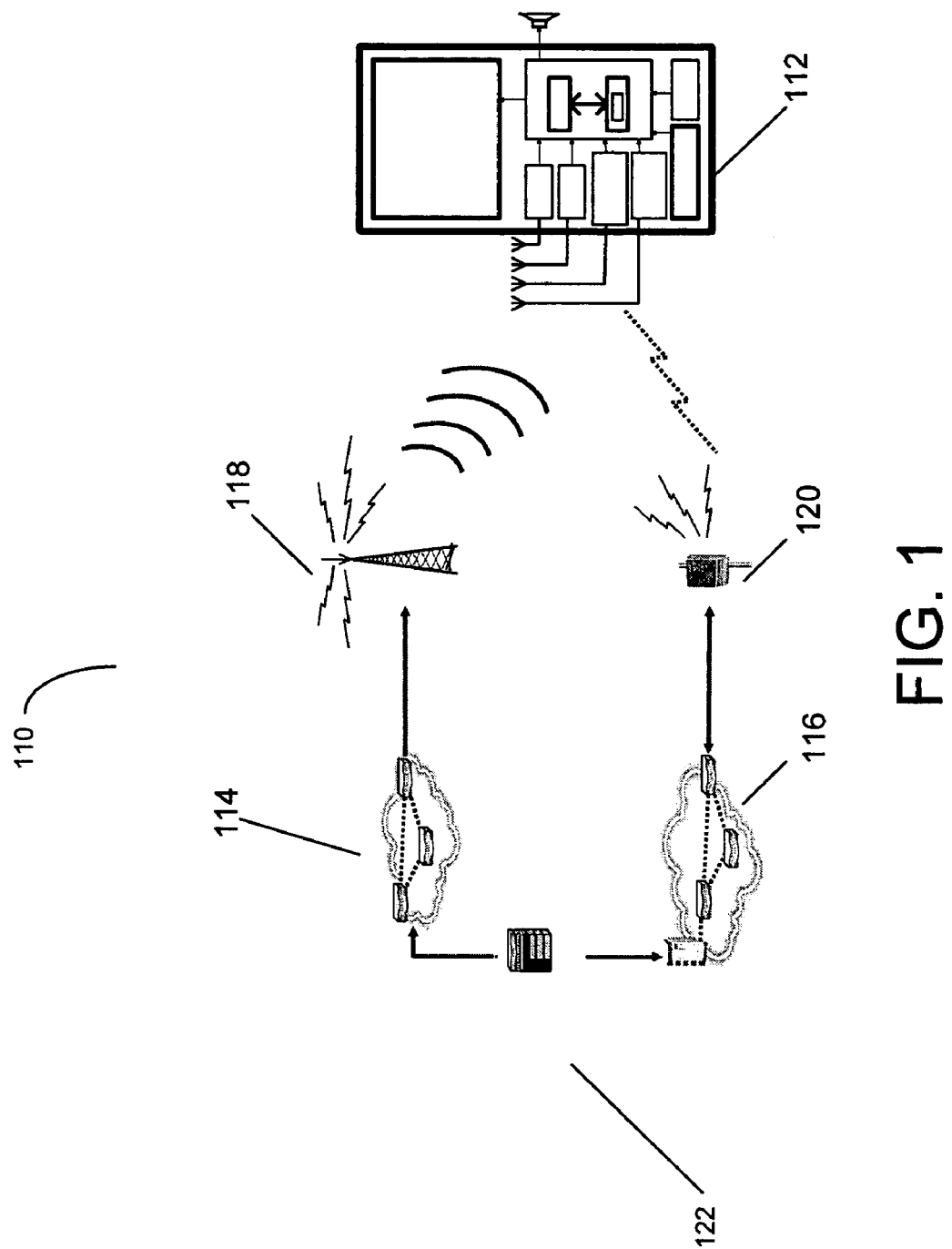
FIG. 1 illustrates an example of a wireless communication system in which one or more illustrative embodiments of the invention may be implemented.

FIG. 1 illustrates an example of a wireless communication system 110 in which the systems and methods of the present invention may be advantageously employed. One or more network-enabled mobile devices 112, such as a personal digital assistant (PDA), cellular telephone, mobile terminal, personal video recorder, portable or fixed television, personal computer, digital camera, digital camcorder, portable audio device, portable or fixed analog or digital radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, analog and/or digital AM/FM radio service providers, SMS/MMS push service providers, Internet content or access providers.

The broadcast network 114 may include a radio transmission of IP datacasting over DVB and/or DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content, which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may include a wireless network and a base transceiver station transmitter 120. The cellular network may include a second/third-generation (2G/3G) cellular data communications network, a Global System for Mobile communications network (GSM), or other wireless communication network such as a WLAN network.

In one aspect of the invention, mobile device 112 may include a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Examples of other digital broadcast standards which digital broadband broadcast system 110 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Forward Link Only (FLO), Digital Audio Broadcasting (DAB), and Digital Radio Mondiale (DRM). Other digital broadcasting standards and techniques, now known or later developed, may also be used. An aspect of the invention is also applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Figure 2:
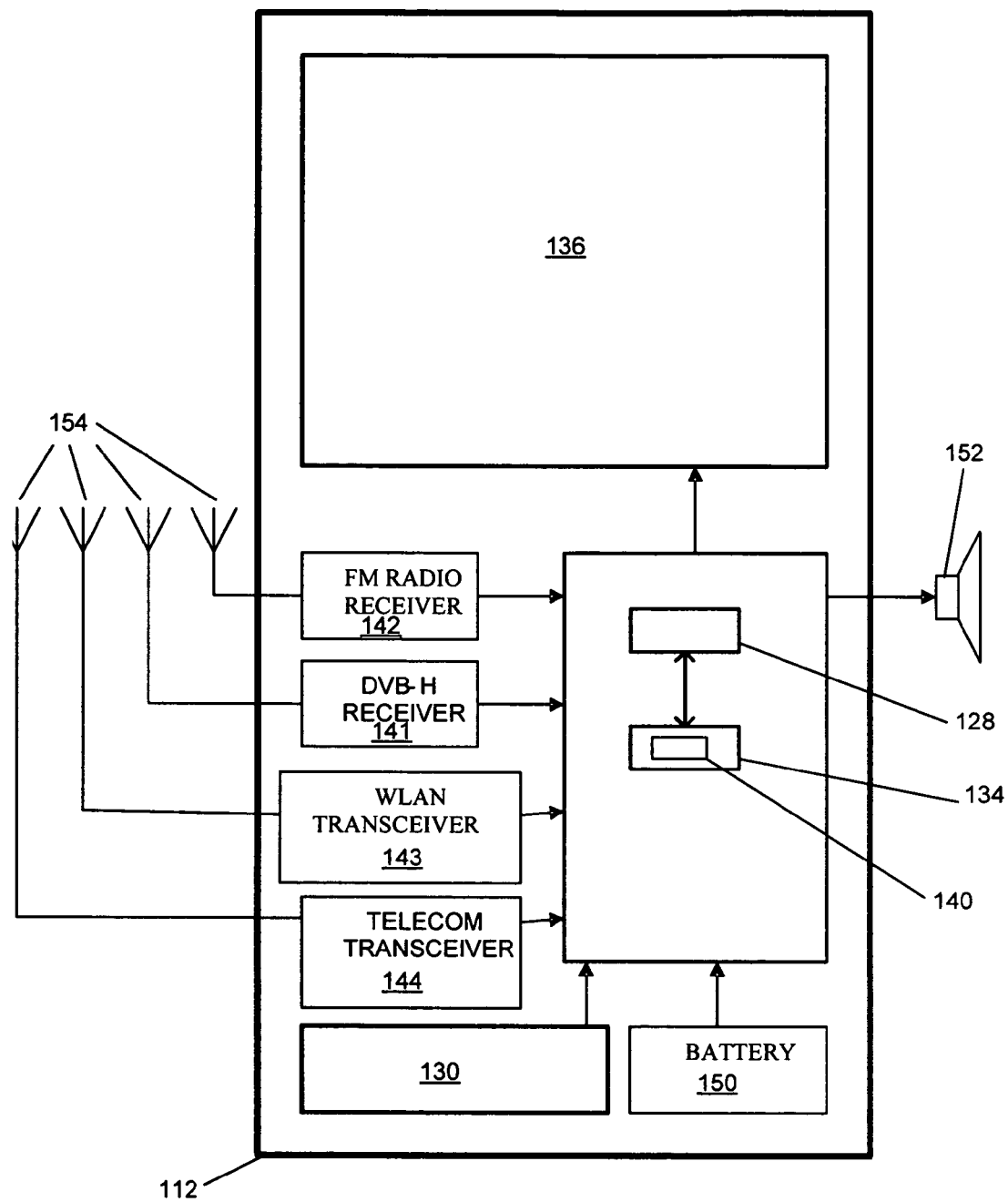
FIG. 2 illustrates an example of a mobile device in accordance with an aspect of the present invention.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an Electronic Service Guide (ESG) may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
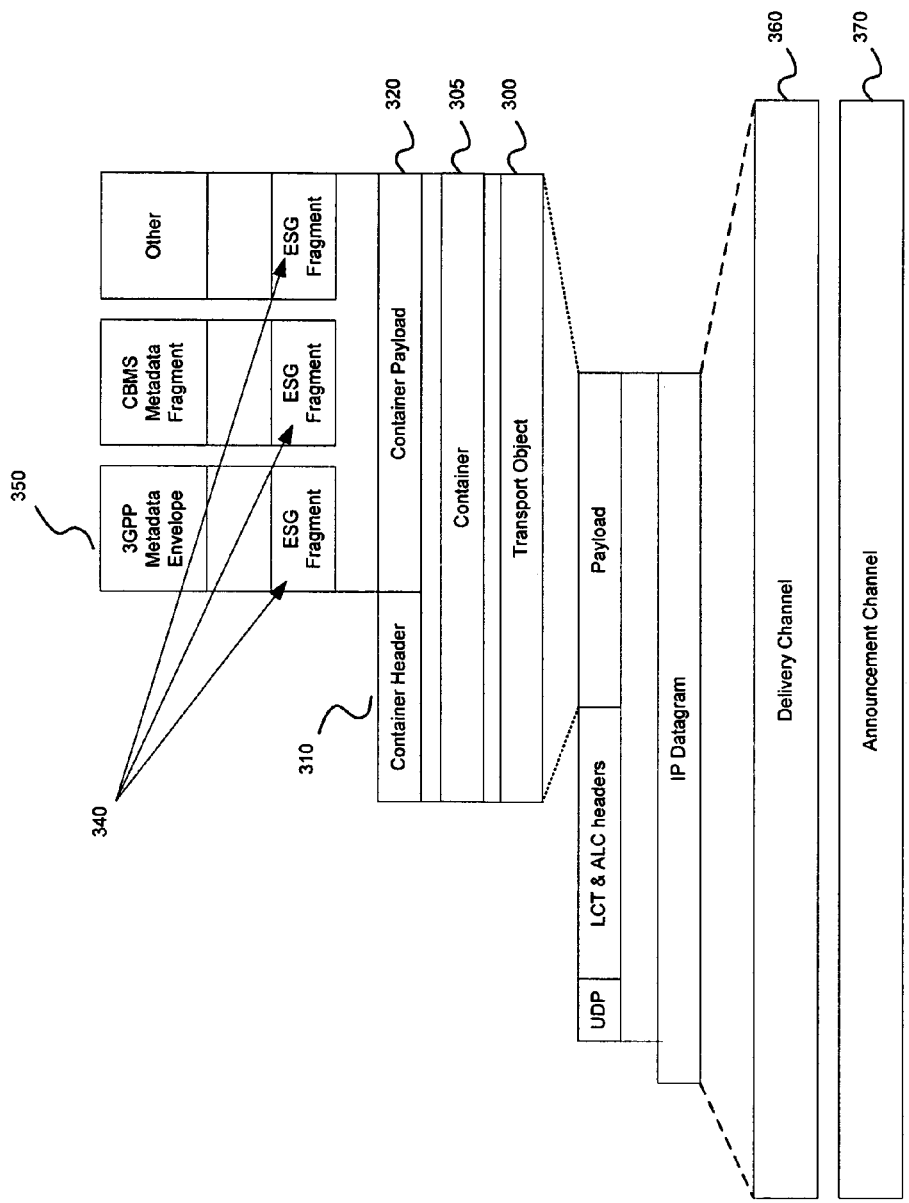
FIG. 3 is a schematic diagram of an example transport object in accordance with at least one aspect of the present invention.

In addition, ESG fragments may be delivered in a transport object which may transport ESG information in a container. Thus, ESG fragments may be placed in a container that may be delivered in its own transport object. The container may further include a container header and a container payload, for example, in which the container header may provide information on where each container is located within the transport object. In one example, the transport object may contain a single container or a plurality of containers, each container including at least one ESG fragment. FIG. 3 is a schematic diagram of an example transport object in accordance with at least one aspect of the present invention. As illustrated in the example of FIG. 3, a transport object 300 may include a container that may include a container header 310 and a container payload 320. In one example, the container header 310 and the container payload 320 are incorporated into a single container 305 which may be incorporated into a single transport object 300 so that the container header 310 need not be recombined with information regarding where each container is located within different transported objects. Alternatively, the transport object 300 may contain a plurality of containers and a container may contain any number of ESG fragments 340. The container header 310 may contain information associated with a corresponding ESG fragment such as, for example, information regarding the container header 310 itself and/or the container payload 320.

In the example illustrated in FIG. 3, the ESG fragment 340 is contained in the container payload 320. The container header 310 may contain descriptors for identifying and describing ESG fragments in the corresponding container payload 320. Thus, the characteristics of the ESG fragment may be identified, such as but not limited to the position of the ESG fragment in the transport object 300 or the length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

Descriptors for identifying and describing ESG fragments may include descriptors such as Service Guide Delivery Descriptors (SGDD). SGDDs carry information on various attributes of ESG fragments such as the availability or validity of the ESG fragments. Hence, the SGDD contains data that can be used to retrieve and/or identify the associated ESG fragments. ESG fragments may also be grouped together and identified as a group by a Service Guide Delivery Unit (SGDU). Grouping of the ESG fragments may be grouped in a variety of ways. For example, the ESG fragments may be grouped together based on certain criteria. The criteria may be declared in an element or parameter such as a Grouping Criteria element of the SGDD. Hence, the SGDD can be used to specify criteria for grouping ESG fragments in a service guide in an SGDU. The criteria used to group ESG fragments can be of any variety such as but not limited to time. For example, ESG fragments corresponding to a particular period of time may be grouped together in a subgroup and identified by a corresponding SGDD. As another example, ESG fragments may be grouped based on content such as content type (e.g., comedy, action, drama, etc.).

An SGDD can also specify a pointer to a transport session for delivering corresponding ESG fragments within a SGDU. For example, an SGDD can identify the transport session based on criteria such as a destination IP address of a target delivery session, the destination port of a target delivery session, the source IP address of the delivery session, or an identifier of the target delivery session. The following table lists examples of sub-elements and attributes of the SGDD.

Figure 4:
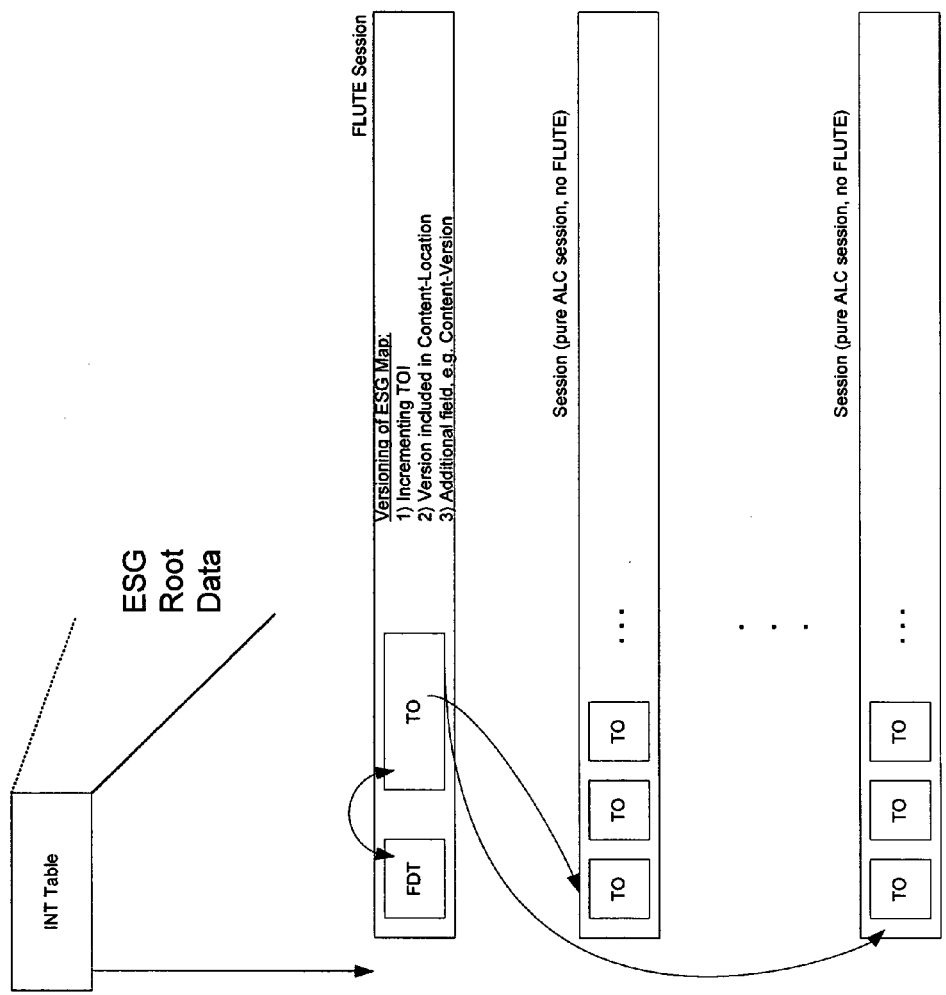
FIG. 4 illustrates an example of transmitting a plurality of single Transport Objects in accordance with at least one aspect of the present invention.

FIG. 4 illustrates an example of transmitting a plurality of single Transport Objects. As illustrated in FIG. 4, the Transport Objects (TO) of the current invention may be carried in, for example, FLUTE (File Delivery over Unidirectional Transport) sessions, or a pure Asynchronous Layered Coding (ALC) session. In the example of FIG. 4, the ESG Root Channel data, such as IP Address, port number and Transport Session Identifier (TSI), are announced in the IP/MAC Notification Table (INT Table) which may be, for example, carried in the SI/PSI stream in DVB-H as one of the SI tables of DVB-H. The FLUTE session of the ESG Root Channel includes a File Delivery Table (FDT) of the session and one or more Transport Objects (TO). These Transport Objects in announcement carousels contain mapping between the different parts of ESGs and access parameters to the different ESG methods in which the ESG data is transmitted. The ESGs may differ from each other. For example, ESGs may be in different languages, genres or encoding.

Examples of access parameters may include, for example, IP Addresses, port numbers, TSIs, start and end times etc. The FLUTE session thus declares how the ESG data is distributed to different sessions. The TOs of the FLUTE session carrying this mapping data are described in the FDT of the FLUTE session. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data is in this example may be delivered in one or more TOs, which may be within pure ALC sessions, for example. The ESG data or parts of it may be delivered in some embodiments of the invention in one or more FLUTE sessions in addition to or instead of ALC sessions.

In one example, program or service content, network information or ESG data may be transmitted or delivered to a mobile TV device. The information delivered to the mobile TV device may be whole information or any fragment thereof. In addition, updates to the information may also be delivered to the mobile TV device which may include the ESG content, program or service content or network information, for example. In addition, the information delivered may include service set-up information of a current service on air.

A system is provided in which an end user may receive a variety of programs or services quickly and efficiently, for example, in IPDC over DVB-H. For example, a mobile terminal may access services of different types without the need for lengthy periods of time for scanning for a frequency or updating of ESG information at the mobile terminal. In this example, services may be provided over channels with fixed packet identifiers (PIDs). In addition, programs or services may be delivered to an endpoint or port in a network, such as a mobile terminal according to an identified IP address and/or port number that may refer to specific ports in a network. Hence, when a program or service is provided over a transmission channel, the program or service is transmitted over the channel based on the PID and may be delivered to ports according to an IP address and/or port number of a mobile terminal.

However, a user may initiate access to programs or services from different locations which may need additional time for scanning for a frequency. In this case, the request in the new location may further need updating of a corresponding ESG at the terminal prior to the receipt and utilization of the program or service. In one example, services may be provided to a mobile terminal in IPDC over DVB-H systems in a timely manner such that a user may access program or service content nearly instantaneously without waiting for initiation of the mobile terminal, location of a proper frequency or updating of ESG at the mobile terminal.

For example, services of varying types may be provided by a transmitter to a mobile terminal. The varying types of services may be provided over a transmission channel as packetized data with each packet of data having a corresponding packet identification (PID). The PID may be assigned to each data packet based on the data contained in the data packet. For example, a mapping table may be used for correlating service channels with PID values and/or IP addresses. In this case, the PID values may be "fixed" such that the PID values are the same for any given type of service, program or transmission channel. Likewise, IP addresses may also be fixed such that the same IP address may be used for any given type of service, program or transmission channel.

As set forth above, individual elements of a program are carried within packets having a unique packet identification (PID) and the program/service may be further organized in a packetized data stream (i.e., the transport stream (TS)). The mapping information for assigning PID values and/or IP addresses may be contained in the TS or within a Transport object (TO) within the TS. In addition, the TO may further contain mapping information for different parts of associated ESG fragments or access parameters including IP addresses and/or port numbers. The mapping table for correlating service channels with PID values and/or IP addresses may further be carried in the session.

In this example, the PIDs and/or IP addresses corresponding to specific service types may be fixed for a given type of service and the service channels may provide services of any type. By having fixed PIDs and/or IP addresses (i.e., the same PID and/or IP address is assigned to services of a given type) for any given type of service, the corresponding service may be accessed quickly and efficiently. Examples of service types may include news, sports, music, kids services/programs, chat services or soap programs/services, to name a few.

FIG. 5 illustrates an example of a mapping table for mapping service channels with corresponding PID values and IP addresses. In one example, a service type is news such that news-related services may be provided to a user via the service channel. The news-related services are provided with a particular PID and IP address. In this example, the PID is 0x4b0 and the IP addresses are within Range A for the news-related services. Thus, in this example, a user may move to a new location but the same PID and IP addresses may be used to receive the desired news-type services. In this case, the user may be in a first location and may receive a news-related service with PID 0x4b0 and IP addresses within Range A. When the user moves to a second location, the user may power on the mobile terminal and may receive a news-related service with the same PID (i.e., 0x4b0) and IP addresses (i.e., in Range A). Thus, access to the desired service may be rapid or nearly instantaneous and content may be displayed on a display at the mobile terminal almost instantly.

FIG. 5 further illustrates multiple service types in addition to news-related services. These examples include sports, music, kids-related services, chat and soap services. Each service type has a corresponding PID and IP address range. In this example, for any given service type, the same PID and IP addresses may be used to provide the desired type of service (i.e., the PID and/or IP addresses may be "fixed"). For example, if a user desires music services on a mobile terminal at a new location, the mobile terminal may access music services via the fixed PID and IP address range as mapped in the mapping table. Thus, the user of the mobile terminal has quick access to services via the mobile terminal.

In one example of quick access, a user at a mobile terminal may power on the mobile terminal at one location. The mobile terminal may provide a user interface in which the user of the mobile terminal may be provided a selection of access modes. FIGS. 6A-6H illustrate examples of user interfaces through which a user may enter selections of access modes and may quickly access services on a mobile terminal. As FIGS. 6A-6H illustrate, a user interface may provide a user a selection of access modes. A user may select any number of access modes to access services. In this example, three access modes are provided—quick, above average and average. When a user selects the "average" access mode in this example, the mobile terminal performs a scan for frequencies within a frequency range. For example, the mobile terminal may perform a full signal scan for the Mobile and Portable DVB-T/H Radio Access Interface (MBRAI) frequency range of 474-698 MHz.

The user in this example may also select the "above average" access mode. In the "above average" access mode, the mobile terminal may scan a limited number of frequencies and may therefore provide a faster scan of the frequencies. For example, in the "above average" access mode, the terminal may limit the signal scan to the subset of signals that are available. Such subset could be e.g. the signals of the first found network. In the latter case, receiver would need to scan frequencies until the first valid DVB-H signal is found. The validation of DVB-H signal can be done in L1 by means of DVB-H indicator available for example in Transmission Parameter Information (TPS). After that it would inspect for example from Network Information table (NIT), which other signals are available within the found network and continue the scan from these signals. Thus, by not scanning the frequencies in other networks, the signal scan is expedited. At a subsequent time, the user at the terminal may be prompted to update the services to "average" mode such that a full signal scan of the MRBAI frequency range may be performed. Another method to implement the "above average" access mode could be e.g. the scanning first the signals that have previously been accessible.

The user in this example may also select the "quick" access mode. In the "quick" access mode, the mobile terminal may perform a signal scan until the first valid DVB-H signal is found and cease signal scan after that. Thus, the signal scan in "quick" access mode may be faster than signal scanning in "above average" access mode or in "average" access mode. At a subsequent time, the user at the terminal may be prompted to update the services to "above average" access mode and/or "average" access mode such that a signal scan may be performed for frequencies within a first found network and/or for the full MBRAI frequency range (i.e., 474-698 MHz).

Figure 6A:
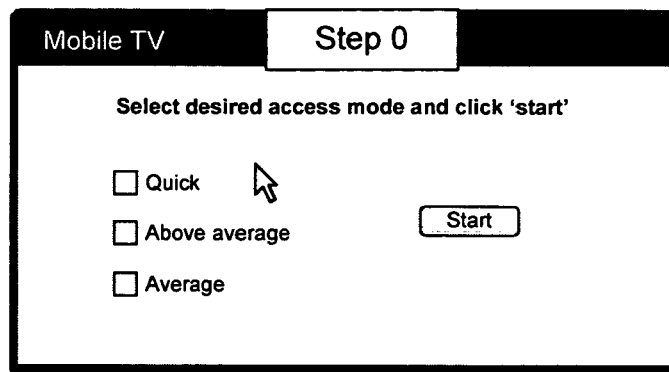
FIG. 6A illustrates an example of a user interface in accordance with at least one aspect of the present invention.
Figure 6B:
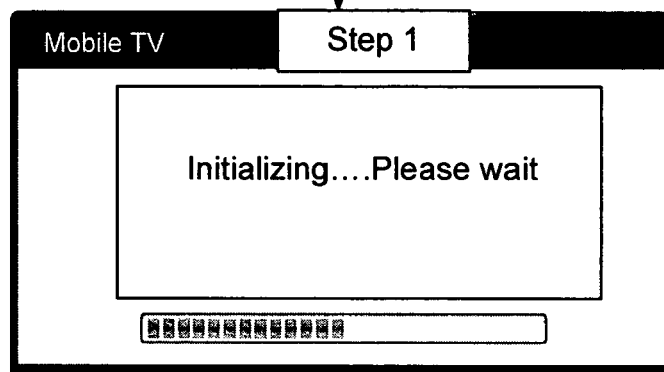
FIG. 6B illustrates an example of a user interface during initial signal scanning in accordance with at least one aspect of the present invention.
Figure 6C:
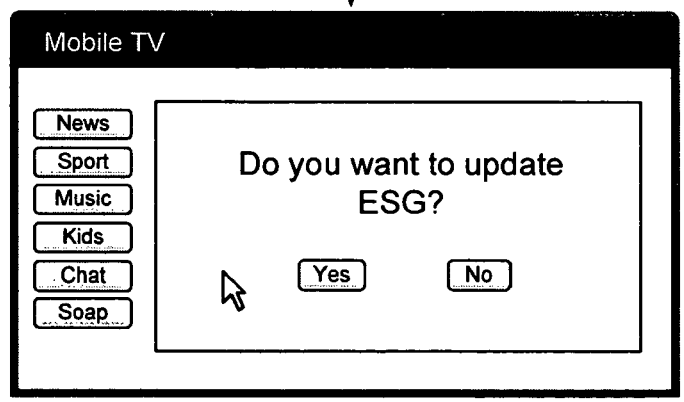
FIG. 6C illustrates an example of a user interface after quick access to services is determined to be available in accordance with at least one aspect of the present invention.
Figures 6D, 6E, 6F, 6G, 6H:
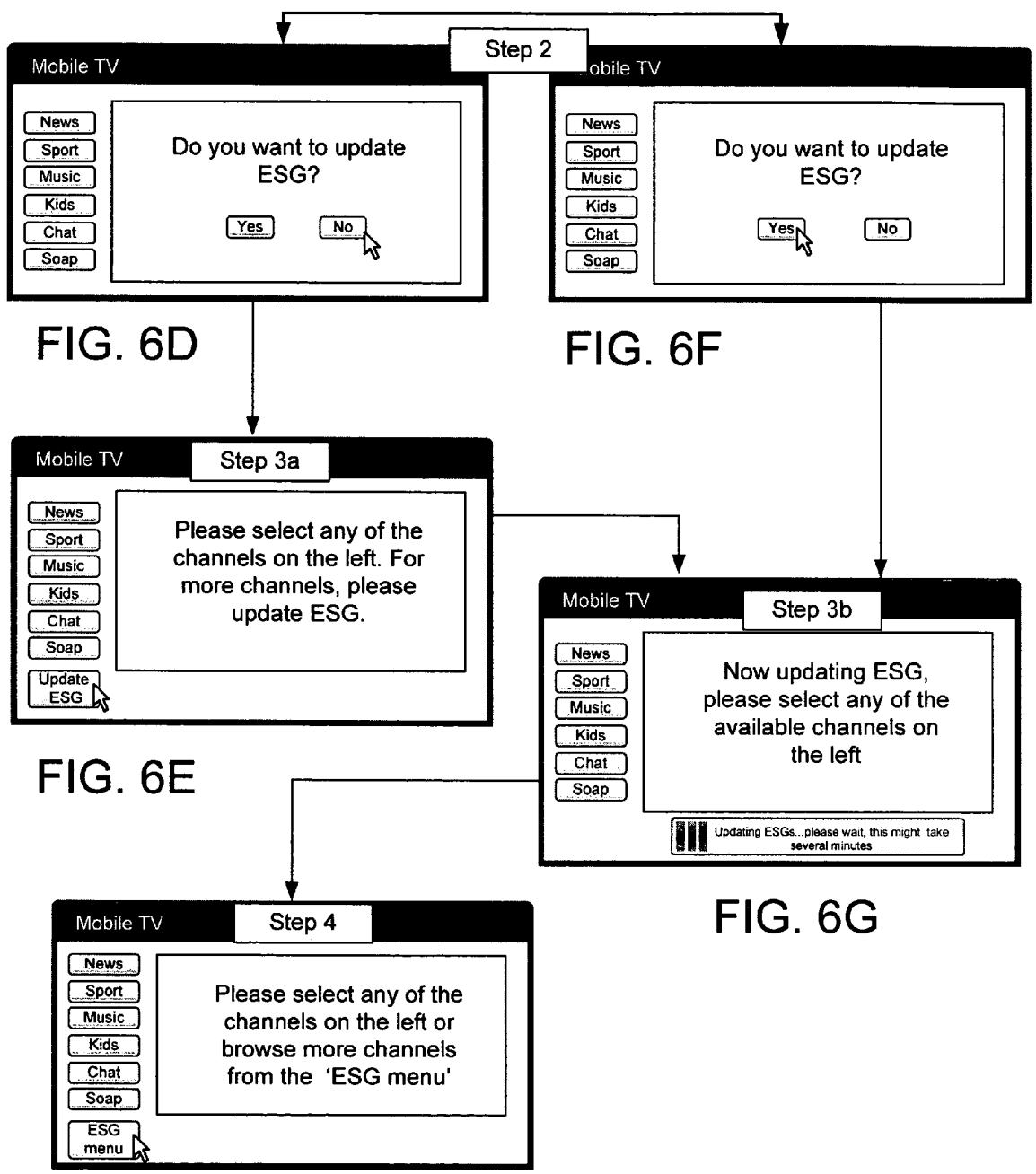
FIG. 6D illustrates an example of a user interface for selecting an option to update ESG information in accordance with at least one aspect of the present invention.
FIG. 6E illustrates an example of a user interface in which an ESG updating option is not selected in accordance with at least one aspect of the present invention.
FIG. 6F illustrates an example of a user interface for selecting an option to update ESG information in accordance with at least one aspect of the present invention.
FIG. 6G illustrates an example of ESG information being updated in accordance with at least one aspect of the present invention.
FIG. 6H illustrates an example of a user interface in which ESG information has been updated in accordance with at least one aspect of the present invention.
Figure 7:
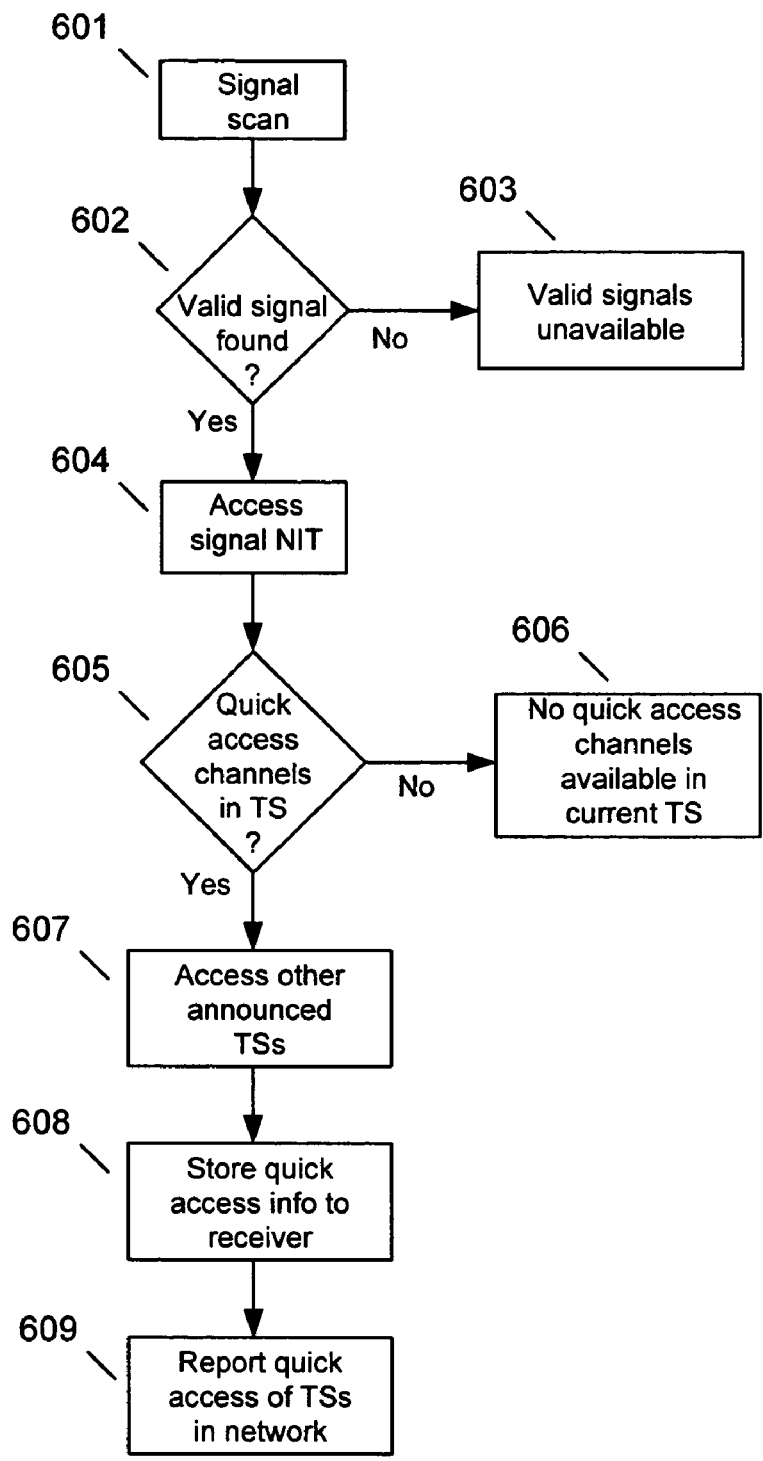
FIG. 7 is a flowchart illustrating one example of a method of quick access to services on a mobile terminal in accordance with at least one aspect of the present invention.

FIG. 7 is a flowchart illustrating one example of a method of quick access to services on a mobile terminal in IPDC over DVB-H. Also, a computer-readable medium may be provided including computer-executable code that may perform a method of quick access to services on a mobile terminal. In one example of the method and the computer-readable medium, a user may select an access mode for accessing available services via a user interface as illustrated in FIGS. 6A-6H. Responsive to a selection of an access mode, scanning for a signal may commence (STEP 601). Scanning for a signal (STEP 601) may entail any of several actions depending on a mode of scanning. For example, one method of scanning for a signal may include scanning until a first frequency with a valid signal is found (e.g., "quick" access mode of FIGS. 6A-6H). This may be a relatively quick process as scanning need only be performed until a first frequency carrying a valid signal is found.

In another example of a mode of scanning, a terminal locates a network and a signal may be scanned only within the located network (e.g., "above average" access mode of FIGS. 6A-6H). In addition, the located network is the first network that is located. Hence, this scanning process may also be relatively fast because less than a full spectrum of frequencies need be scanned.

In yet another example of a mode of scanning, a terminal may scan a full spectrum of frequencies (e.g., "average" access mode of FIGS. 6A-6H). For example, the MBRAI frequency range of 474-698 MHz may be scanned. Any mode of scanning may be selected by a user. If the user selects scanning for the first frequency, then in one example, the system may scan for the first frequency and may prompt the user to update services to any of the other modes to continue searching for additional frequencies. If the system searches for a network and limits the search of frequencies within the first network found, then after determining a frequency within the located network, the system may prompt the user to update the services by searching the MBRAI frequency range of 474-568 MHz to provide the full scope of services available.

After selection of the access mode, the terminal may scan for a signal. FIG. 6B illustrates an example of a user interface during initial signal scanning at the terminal in which a user is prompted to wait while the terminal scans for a first signal. For example, the terminal may scan for a DVB-H signal while a progress bar is displayed on a display of the terminal.

If a valid signal is found ("YES" branch of STEP 602, FIG. 7), the terminal may access the signal in a network information table (NIT) (STEP 604) and determine if the received TS contains a descriptor for indicating that quick access is available for the received TS. Quick access indicator can be also associated with the DVB-H signal by some other means than through descriptor in NIT. Otherwise, if a valid signal is not found (e.g., no DVB-H services are identified as carried by a signal, "NO" branch of STEP 602), then valid signals are unavailable (STEP 603). A message may be provided at the mobile terminal to notify the user that a valid signal (e.g., a signal that carries DVB-H services) is not available (STEP 603). In one example, a signal is determined to be "valid" if the signal carries DVB-H services.

FIG. 6C illustrates an example of a user interface after quick access to services is determined to be available in a current TS ("YES" branch of STEP 605, FIG. 7). In this example, the user interface prompts the user to indicate if updating of an ESG is desired. If the user elects not to update the ESG (FIG. 6D), a user interface may be provided to the user for selection of a channel containing services with quick access. These services may be transmitted within a fixed PID and/or fixed IP address and are available in the current TS. The fixed PID and/or IP addresses may be listed for example in standard and/or in any public media. The available quick services may be displayed in the user interface as illustrated in FIG. 6E. As FIG. 6E illustrates, updating of ESG information was not selected and quick access services are available as displayed on a user interface. The user at the mobile terminal may select any of the quick access services. Examples of available quick services are illustrated in FIG. 6E as news-related services, sports services, music services, services for children ("kids"), chat services, or soap services. These are merely examples of quick services and any types of services may be provided in addition or in lieu of any of the services illustrated.

Also, in STEP 605, quick access of services may be accomplished by signaling with an identifier associated with a table and the PID. For example, the table may contain globally unique PIDs and may be defined for each quick access service type. In this case, a receiver or mobile terminal may synchronize to the signal, identify the table based on the identifier associated with the table and determine if globally unique PIDs in the table are associated with the types of quick access services. In another example of quick access of services, an indicator or parameter for indicating the availability of quick access services may be carried within Network Information Table (NIT), Event Information table (EIT), Service Description Table (SDT) or Program Map Table (PMT) of the DVB-H system. If PMT is used, the indicator may be allocated within the same PMT as the PIDs. In yet another example of quick access of services, the availability of quick access services may be indicated by an interaction channel or alternative broadcast channel. For example, SMS Bluetooth or other interaction network or broadcast channel may be used and the receiver may discover the information prior to synchronizing to the signal.

If a user at the mobile terminal wishes to update ESG information to gain access to the complete ESG menu in addition to the quick access services, the user may request an ESG update. For example, a user interface as illustrated in FIG. 6F may be displayed in which a user may select an option to update ESG information. As FIG. 6F illustrates, a user selects a "YES" option to update ESG information. Alternatively, a user may elect to update ESG information at any subsequent time as well. For example, a user may elect not to update ESG information (FIG. 6D) but may later decide to update ESG information to gain the full spectrum of services available through a complete ESG menu. FIG. 6E illustrates an example of a user at a mobile terminal selecting an option to update ESG information.

When a user at a mobile terminal requests updating of ESG information, a user interface may be provided that indicates that ESG information is updating. A progress bar may also be displayed that indicates the progress of the ESG updating. Also, ESG information updating may occur in the background. In this case, the user at the mobile terminal may perform other operations in the foreground while ESG information is updating in the background so that the user is not disturbed in other activities. FIG. 6G illustrates an example of ESG information being updated in the background. FIG. 6G also illustrates an example of a progress bar on the user interface for indicating the progress of the ESG updating procedure. The progress bar in FIG. 6G may further display the time remaining in updating the ESG information, if desired (not shown). FIG. 6H illustrates an example of a user interface in which the ESG information has been updated and the user may select an option to display a menu displaying all programs or services available at the mobile terminal.

Hence, a user at a mobile terminal may select an access mode (e.g., "quick", "above average", or "average") via a user interface such as the user interface illustrated in FIG. 6A, which may provide at the mobile terminal quick access services that are transmitted from a remote source with a fixed PID and/or fixed IP address (or IP address range). The mapping of the channel and the PID and/or IP addresses which may further be based on type of service provided, may be provided in the TS in a mapping table as illustrated in FIG. 5. The quick access services may be provided quickly or nearly instantaneously to a mobile terminal as the same PID and/or IP address may be used to provide the corresponding service. Updating of ESG information may be requested to obtain the full spectrum from an ESG menu. The updating of the ESG information may be performed in the background, if desired, so as not to interrupt or impede other activities at the mobile terminal. After ESG information is updated, the full or complete ESG menu of services may be provided in addition to the quick access services already provided.

In the quick access discovery process as further illustrated in FIG. 7, other TSs may be checked within the Network Information Table (NIT) for quick access information (STEP 607). If other announced TSs are present in the NIT, quick access information corresponding to the announced TSs is obtained and stored in memory at the mobile terminal (STEP 608). The availability of other TSs within the network may be reported to the mobile terminal accordingly (STEP 609). Likewise selections of quick access services of the other TSs may be provided in a user interface through which a selection by a user may be performed to activate the desired quick access service.

Figure 8:
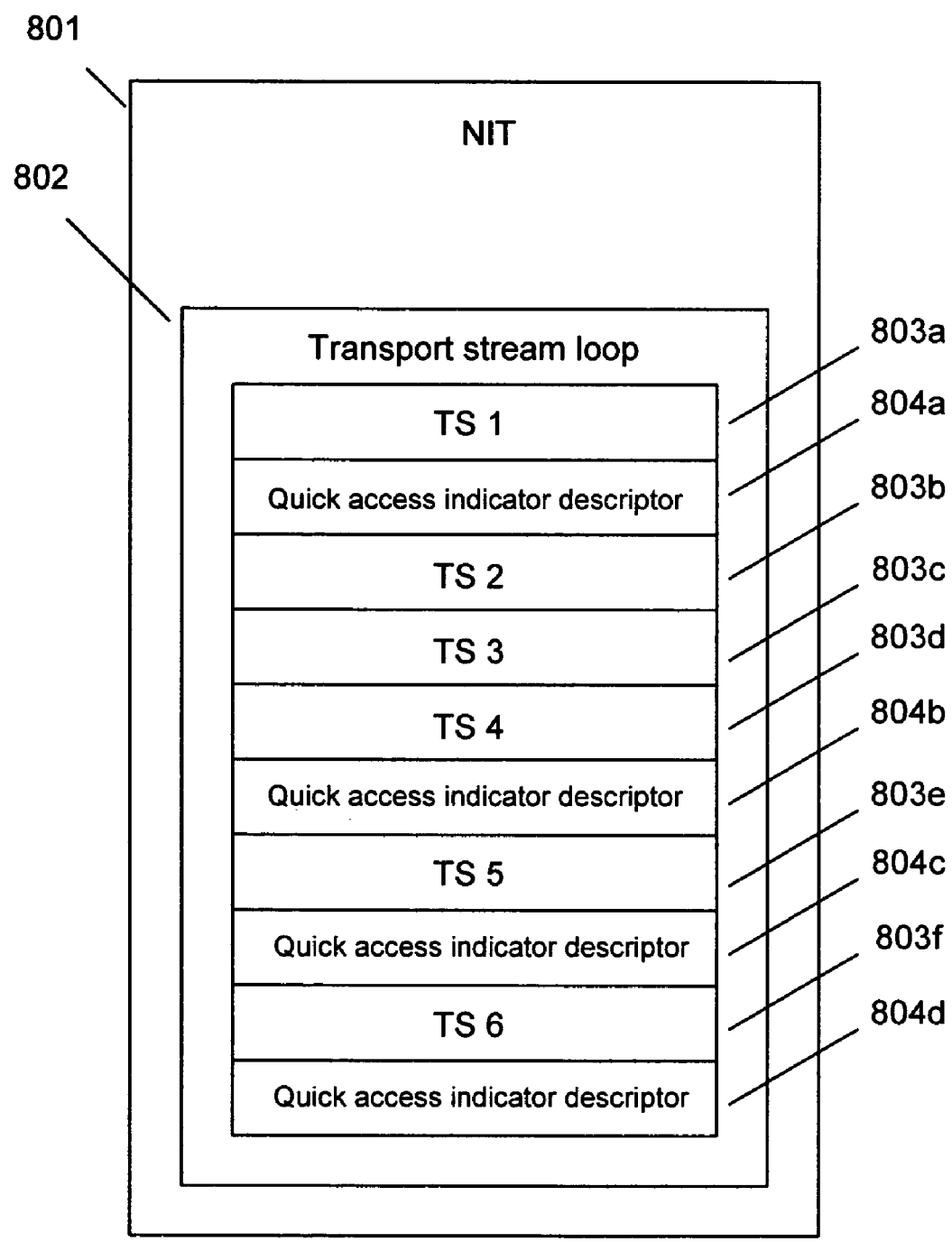
FIG. 8 illustrates an example of associating Transport stream with quick access services through Network Information Table (NIT) in accordance with at least one aspect of the present invention.

As set forth above, an indicator or descriptor may be provided in the TS for indicating the availability of quick access services. Each indicator or descriptor may be provided in the Network Information Table (NIT) as associated with a corresponding TS. FIG. 8 illustrates an example of a NIT containing a transport stream loop in which transport streams (TSs) may be associated with an indicator or descriptor for indicating the availability of quick access services. In this example the NIT 801 may be transported in a TS and may further contain a transport stream loop 802. The transport stream loop 802 may further contain any number of TSs. As FIG. 8 illustrates, the transport stream loop 802 of this example contains TS 1 (803*a*), TS 2 (803*b*), TS 3 (803*c*), TS 4 (803*d*), TS 5 (803*e*) and TS 6 (803*f*). Some of the TSs may have an associated indicator or descriptor for indicating the presence or availability of quick access services. In this example, TS 1 (803*a*), TS 4 (803*d*), TS 5 (803*e*) and TS 6 (803*f*) are each associated with a indicator or descriptor (804*a*, 804*b*, 804*c*, and 804*d*, respectively) that are associated with TS 1, TS 4, TS 5, and TS 6 (803*a*, 803*d*, 803*e*, and 803*f*, respectively). In this example, TS 1, TS 4, TS 5 and TS 6 (803*a*, 803*d*, 803*e*, 803*f*), may carry quick access services as indicated by the indicator/descriptors 804*a*, 804*b*, 804*c*, and 804*d*, respectively. Also in this example, TS2 and TS3 (803*b* and 803*c*) do not have an associated indicator/descriptor and, hence, do not carry quick access services.

The indicator or descriptor may be a data structure for identifying quick access services in a TS. The indicator or descriptor may further be stored on a computer-readable medium. FIG. 9 illustrates an example of an indicator or descriptor for identifying quick access services in a TS. In this example, the indicator or descriptor contains a field for describing the indicator or descriptor (e.g., a descriptor tag field) and a field for indicating the length of the indicator/descriptor (e.g., a descriptor length field).

Figure 10:
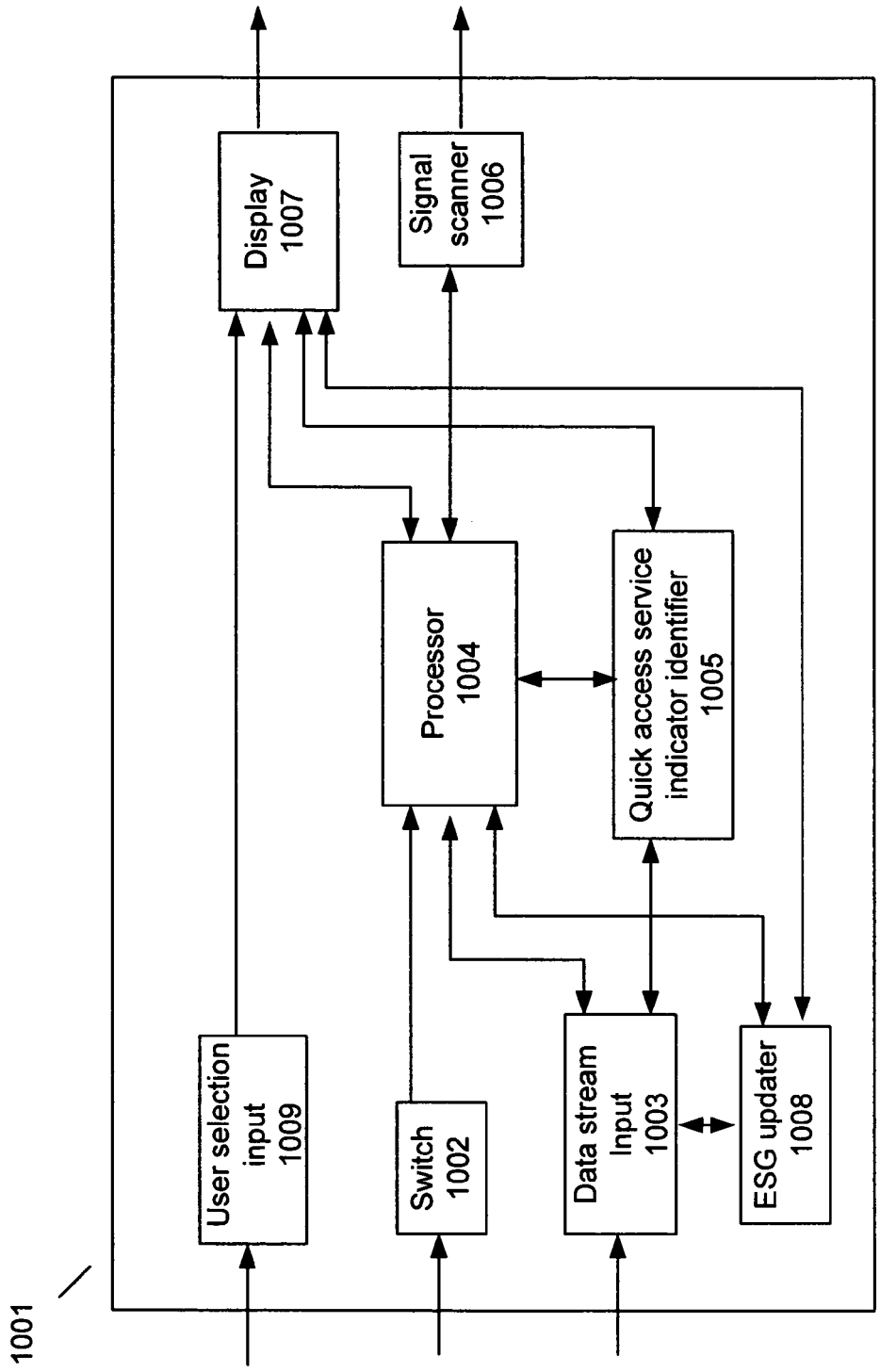
FIG. 10 is a partial block diagram illustrating an example of a receiver in accordance with at least one aspect of the present invention.

FIG. 10 is a partial block diagram illustrating an example of a receiver or mobile terminal for receiving quick access services. The receiver 1001 may include a switch 1002 for powering on the receiver 1001. A user may input a command via the switch 1002 which may power on the processor 1004 of the receiver 1001 for receiving a data stream. The processor 1004 may also control the display 1007 to display a user interface for selection of an access mode. A user may input a selection of an access mode via a user selection input 1009 through the display 1007. The user input may be transported to the processor 1004 for controlling a signal scanner 1006 based on the user selection received via the user selection input 1009. For example, if the user inputs a command via the user selection input 1009 to scan for a signal over the MBRAI frequency range of 474-698 MHz, the processor 1004 controls the signal scanner 1006 to scan for a signal accordingly. Likewise, if the user enters a command via the user selection input 1009 to scan for signals over a limited range of frequencies (e.g., scan for frequencies within a first found network only or scan for a first found frequency only), then the signal scanner 1006 scans for signals according to the processor 1004 control.

The signal scanner 1006 may identify a signal, such as a DVB-H signal, and return an indication to the processor 1004 that a valid signal has been found. In this case, the processor 1004 receives the indication from the signal scanner 1006 that a valid signal has been found and controls the quick access service indicator identifier 1005 to check for an indicator or descriptor within a received TS. The indicator or descriptor for indicating that quick access services, in this example, are available in the current TS received via the data stream input 1003. If an indicator/descriptor is identified in the TS, then a quick access service is available in the current TS at a fixed PID and/or fixed IP address. The quick access service indicator identifier 1005 provides the information via the processor 1004 to the display 1007 to display a selection of quick access services on the display 1007 to the user. The user may select an option displayed on the display 1007 to select a desired quick access service.

Alternatively, the display 1007 may provide a user interface such that a user may request updating of ESG information. In this example, a user may input a command via the user selection input 1009 via the user interface on the display 1007. The command may be transported to the processor 1004 to control the ESG updater 1008 to update the ESG information. After the ESG information is updated via the ESG updater 1008, the data may be sent to the processor 1004 for display of a selection menu on the display 1007 through which a user may select a desired service. In this case, the selection menu on the display 1007 may include services from a complete ESG menu in addition to quick access services.

Figure 12:
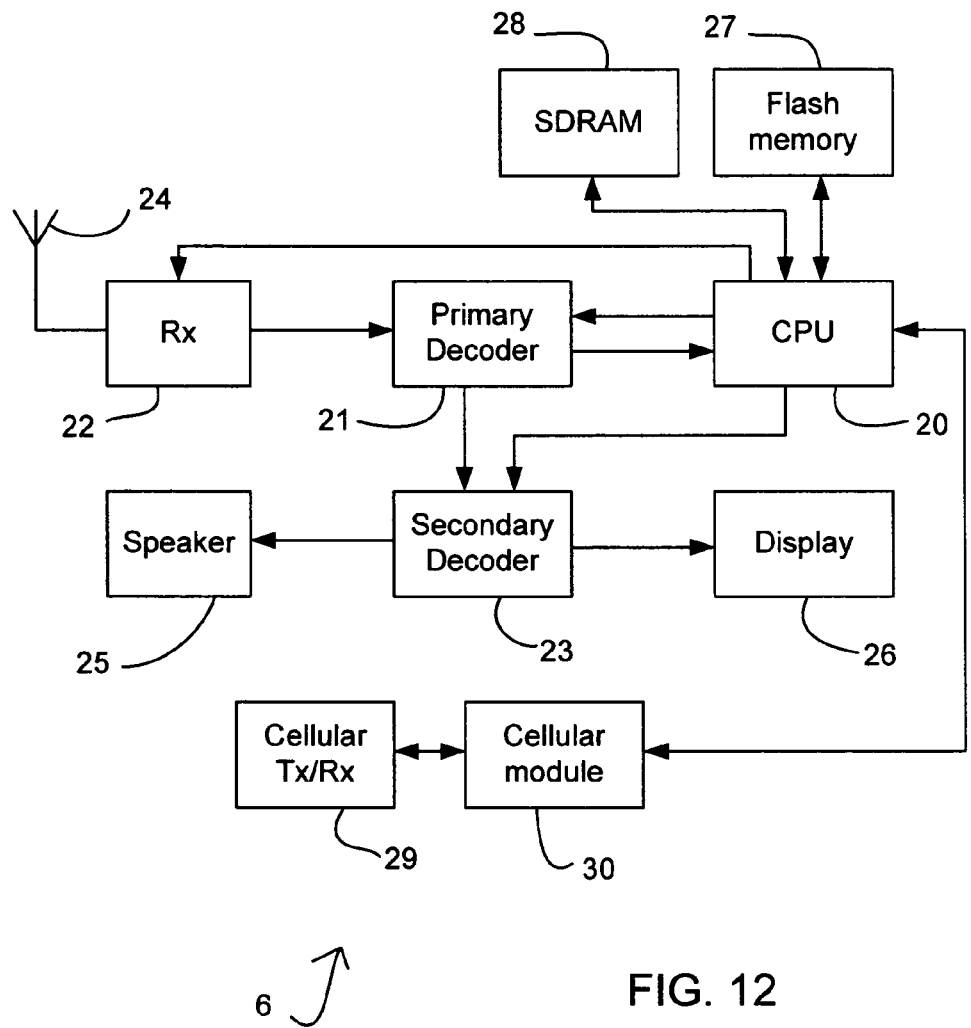
FIG. 12 is a partial block diagram illustrating an example of a receiver in accordance with at least one aspect of the present invention.

FIG. 12 is a partial block diagram of another example of a receiver. In this example, the receiver may include a CPU 20 for controlling the receiver 6 in scanning for a signal responsive to an access mode. A user may further select an access mode via cellular Tx/Rx 29 and cellular module 30. A selection of an access mode may be transmitted to the CPU 20 of the receiver 6 and may be further control the access mode of Rx 22. If a valid signal is detected in the input of the Rx 22, the receiver may access a network information table (NIT) that may be stored in SDRAM 28 or Flash memory 27, for example. Based on the data in the NIT, the receiver may determine if a received TS contains a descriptor for indicating that quick access is available. The received data including the valid signal may be decoded via a primary decoder 21 for further processing at the CPU 20. Also, the receiver may include a secondary decoder 23 for further processing of an input signal.

If a valid signal is not found, then a message may be provided at the display 26 via the secondary decoder 23 at the mobile terminal to notify the user that a valid signal (e.g., a signal that carries DVB-H services) is not available. Alternatively, an audio output via speaker 25 may be provided to alert the user that a valid signal is not available.

If quick access to services is determined to be available in a current TS, the user may be provided with an interface on the display 26 for selecting updating of an ESG is desired. Also, a user interface may be provided on the display 26 to the user for selection of a channel containing services with quick access. These services may be transmitted within a fixed PID and/or fixed IP address and are available in the current TS. The fixed PID and/or IP addresses may be listed for example in standard and/or in any public media. The available quick services may be displayed in the user interface on the display 26. The user at the mobile terminal may select any of the quick access services as provided on display 26.

Quick access of services may be accomplished by signaling with an identifier associated with a table and the PID. For example, the table may contain globally unique PIDs and may be defined for each quick access service type. In this case, a receiver or mobile terminal may synchronize to the signal, identify the table based on the identifier associated with the table and determine if globally unique PIDs in the table are associated with the types of quick access services. In another example of quick access of services, an indicator or parameter for indicating the availability of quick access services may be carried within Network Information Table (NIT), Event Information table (EIT), Service Description Table (SDT) or Program Map Table (PMT) of the DVB-H system. If PMT is used, the indicator may be allocated within the same PMT as the PIDs.

If a user at the mobile terminal wishes to update ESG information to gain access to the complete ESG menu in addition to the quick access services, the user may request an ESG update via cellular Tx/Rx 20 and cellular module 30. For example, a user interface may be displayed on display 26 through which a user may select an option to update ESG information.

The user at the mobile terminal may request updating of ESG information via input at the cellular Tx/Rx 29 and cellular module 30 responsive to a user interface on the display 26. ESG data updating may be performed via the CPU 20, primary decoder 21, and/or secondary decoder 23 and a progress bar may be displayed on the display 26.

Figure 11:
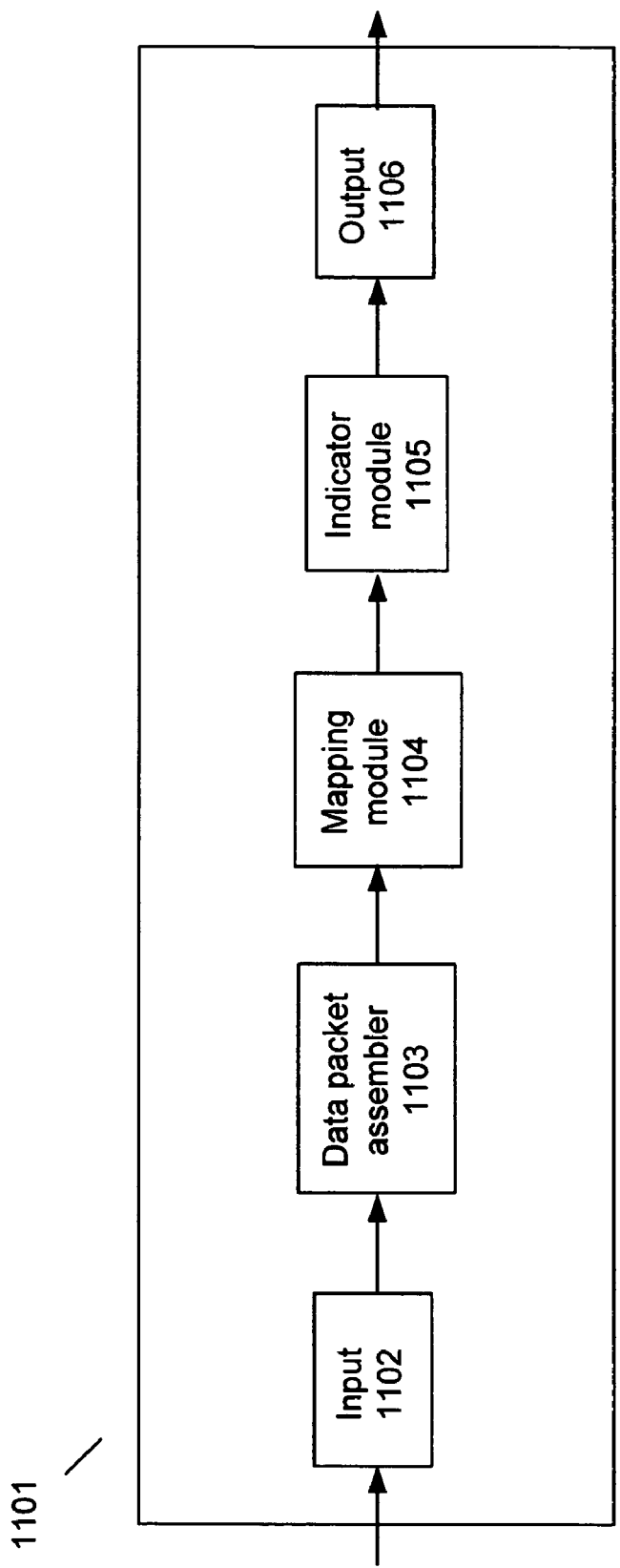
FIG. 11 is a partial block diagram illustrating one example of a transmitter in accordance with at least one aspect of the present invention.

FIG. 11 is a partial block diagram illustrating one example of a transmitter for providing quick access services to a mobile terminal. The transmitter 1101 may contain an input 1102 for receiving services for transmission to a mobile terminal. The services may be received from any data source. The input data may be received at the input 1002 and may be processed for transmission at the data packet assembler 1103. The data packet assembler 1103 assembles the service data into data packets for transmission in a data stream. Each component of the service data is packetized into packets of fixed length packets, including a header in the data packet assembler 1103.

The transmitter may further include a mapping module 1104 for providing a mapping of PID and/or IP addresses to a type of service. Thus, a unique PID value may be assigned to data packets containing information of a particular type of service. The PID value may be obtained in the mapping module 1104 and assigned to the corresponding data packets. The transmitter 1101 may also contain an indicator module for inserting an indicator in the data stream, the indicator for indicating the availability of quick services to the receiver or mobile terminal. Hence, when a data stream containing the indicator is received at a mobile terminal, the mobile terminal may identify the indicator in the data stream and may thus be informed that the data stream contains quick access services.

The transmitter 1101 of FIG. 11 also contains an output 1106 which transmits the data stream to the mobile terminal. Hence, the data stream transmitted via the output 1106 of the transmitter 1101 of this example contains quick service data of a particular type, the data being organized in data packets and each data packet having a corresponding PID. In addition, the data stream may also include additional information such as an IP address associated with the data stream. The PID and/or IP address may be fixed (i.e., the same for common types of service, program or transmission channel) and may be obtained from a mapping module 1104 in the transmitter 1101. Also, the data stream may contain an indicator for indicating the availability of quick services in the data stream.

The embodiments herein include any feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques.

We claim:

1. A method comprising:
    locating, at a mobile terminal, a signal corresponding to a data stream carried by a transport stream;
    detecting an identifier associated with the transport stream, the identifier indicating an availability of a quick access service in the data stream;
    receiving the quick access service at the mobile terminal over a transmission channel based on the identifier,
    wherein data of the quick access service is associated with one or more of the following: a globally fixed packet identifier (PID), an Internet Protocol (IP) address or a range of IP addresses.

2. The method of claim 1, wherein locating the signal comprises finding a first network and scanning for the signal only within the first network.

3. The method of claim 1, wherein locating the signal comprises scanning for the signal over a predefined frequency range.

4. The method of claim 1, further comprising selecting Electronic Service Guide (ESG) information corresponding to the data stream.

5. The method of claim 4, further comprising updating ESG information in the background substantially simultaneously with receiving of the quick access service at the mobile terminal.

6. The method of claim 5 further comprising receiving a service corresponding to the updated ESG information at the mobile terminal after receiving the quick access service.

7. The method of claim 1, wherein locating the signal comprises scanning for the signal until a first frequency carrying the transport stream is found and wherein receiving the quick access service includes receiving the quick access service immediately after the first frequency is found.

8. The method of claim 7, further comprising finding a first network and scanning for the signal only within the first network.

9. The method of claim 8, further comprising scanning for the signal over a Mobile and Portable Digital Video Broadcasting—Terrestrial/Handheld (DVB-T/H) Radio Access Interface (MBRAI) frequency range.

10. The method of claim 1 wherein the fixed PID is associated with a type of the quick access service.

11. The method of claim 1 wherein receiving the quick access service comprises receiving a first quick access service of a first type at a first fixed PID and receiving a second quick access service of a second type at a second fixed PID.

12. The method of claim 11 wherein all quick access services of the first type are received at the first fixed PID and all quick access services of the second type are received at the second fixed PID.

13. An apparatus comprising:
    a processor; and
    memory storing computer readable instructions that, when executed, cause the apparatus to:
        locate a signal corresponding to a data stream carried by a transport stream;
        detect an identifier associated with the transport stream, the identifier indicating an availability of a quick access service in the data stream;
        receive the quick access service over a transmission channel based on the identifier,
        wherein data of the quick access service is associated with one or more of the following: a globally fixed packet identifier (PID), an Internet Protocol (IP) address or a range of IP addresses.

14. The apparatus of claim 13, wherein the locating the signal corresponding to a data stream comprises finding a first network and scanning for the signal only within the first network.

15. The apparatus of claim 13, wherein the locating the signal corresponding to a data stream comprises scanning for the signal over a predefined frequency range.

16. One or more computer readable media storing computer readable instructions that, when executed, cause an apparatus to:
- locate a signal corresponding to a data stream carried by a transport stream;
- detect an identifier associated with the transport stream, the identifier indicating an availability of a quick access service in the data stream;
- receive the quick access service over a transmission channel based on the identifier, wherein data of the quick access service is associated with one or more of the following: a globally fixed packet identifier (PID), an Internet Protocol (IP) address or a range of IP addresses.

17. The one or more computer readable media of claim 16, further comprising selecting Electronic Service Guide (ESG) information corresponding to the data stream.

18. The one or more computer readable media of claim 17, wherein updating ESG information is performed in the background substantially simultaneously during the receiving of the quick access service at the apparatus.

* * * * *